United States Patent Office 2,967,168
Patented Jan. 3, 1961

2,967,168

VINYL-SUBSTITUTED SILICA AEROGELS

Dallas T. Hurd, Burnt Hills, N.Y., assignor to General Electric Company, a corporation of New York No Drawing. Filed Nov. 12, 1954, Ser. No. 468,567

7 Claims. (Cl. 260—42)

The present invention relates to novel vinyl silica aerogels. More particularly, it is concerned with aerogels of silica containing silicon-bonded vinyl groups.

U.S. Patents 2,441,422 and 2,441,423, both issued May 11, 1948, and assigned to the same assignee as the present invention, describe aerogels of silica containing silicon-bonded methyl groups. Although such types of aerogels have been useful in many applications, they lack the versatility which has come to be expected from many fillers. Although the silicon-bonded methyl groups impart hydrophobicity, nevertheless outside this property and possibly improved compatibility with silicone rubbers when the silicon aerogel is used as a filler, no further commercial usefulness is inherent in the presence of silicon-bonded methyl groups.

The present invention is based on the discovery that the character of silica aerogel may be greatly modified by attaching to the silicon of the silica aerogel a vinyl group. The presence of the vinyl group, in addition to imparting the hydrophobicity and compatibility inherent in the presence of methyl groups, has the additional property of being copolymerizable with various copolymerizable monomers and polymers and, in addition, when employed as a filler, for instance, in silicone rubber containing silicon-bonded alkenyl groups, is capable of entering into chemical reaction with the silicone rubber binder in the presence of the vulcanizing agents usually employed for the purpose, such as benzoyl peroxide, thus leading to novel compositions having useful and interesting characteristics. These vinyl-modified silica aerogels may be obtained by cohydrolyzing a vinylchlorosilane (e.g., vinyltrichlorosilane, divinyldichlorosilane, trivinylchlorosilane, etc.) and a silicon tetrahalide, such as silicon tetrachloride, or a tetraalkoxy silane, in water, separating the resulting gel and, following further processing, removing the liquid from said gel at an elevated temperature and above the critical temperature and pressure of the vaporized liquid, thereby to form the above-described vinyl-modified silica aerogel.

The procedure for preparing these vinyl-modified silica aerogels is relatively simple. One method comprises hydrolyzing a mixture of the vinylchlorosilane with the silicon tetrahalide in a mixture of ice and water, separating the resultant gel by filtration, advantageously washing the gel with water, and then dissolving it in an aqueous solution of an alkali-metal hydroxide, e.g., sodium hydroxide, potassium hydroxide, etc. Thereafter, this alkaline solution of silica and vinyl-modified silica is advantageously mixed with an acid, such as sulfuric acid, hydrochloric acid, until the pH of the mixture is about 2 to 3, while maintaining the temperature below room temperature. The alkali metal ion of the alkali metal hydroxide is precipitated by treating the acidic solution with, for instance, an alcohol, such as ethanol, and removing the precipitated inorganic salt, e.g., sodium sulfate, when hydroxide and sulfuric acid are used, by filtration. The alcohol solution is then treated to insure removal of all alkaline ions, such as by passage through an ion exchange resin. Thereafter, this alcohol solution is placed in a pressure reactor of such size that the liquid in the gel is present in at least the amount required to fill the vessel at the critical density. The vessel is heated with its contents until the temperature and pressure equal or barely exceed the critical constants of the mixture, and thereafter releasing the vapor at above the critical temperature. In order that one obtain vinyl-modified silica aerogels of the present invention, it is essential that certain precautions be observed in contrast to the degree of caution required in making the usual silica aerogel. For instance, when one is preparing silica aerogel, as long as the temperature and pressure inside the reactor are above the critical limits of the mixture, one can then release the vapors without observing any particular care to obtain a satisfactory aerogel. However, in the case of the present invention, because of the chemically reactive nature of the vinyl groups, it is essential, if one is to obtain an aerogel without serious loss of vinyl groups, that one maintain the temperature at the time of release of the vapor as low as possible. In order to accomplish this, it is essential to use a liquid medium having a relatively low critical temperature, such as methanol and ethanol in which there is a minimum or complete absence of residual water present therein, usually as a result of previous processing operations. When using the above-mentioned alkanols, the temperature at which the vapors are released should be barely above the critical values of the alkanol. For this purpose, one advantageously employs in the preparation of the above-described vinyl aerogels, temperatures as low as about 275–300° C. but preferably not over 375° C. especially when using ethyl alcohol.

Alternatively, the water-repellent vinyl-containing aerogel may be prepared in the manner described in U.S. Patent 2,285,449, Marshall, i.e., by adding a quantity of a water-miscible organic liquid to the cosol prior to its conversion to a gel, removing the precipitated inorganic salts, and thereafter removing the liquid phase in the sol, following the same process as that employed in preparing aerogel, i.e., by removing the liquid phase of the sol without substantially subjecting the sol to a compression of liquid-sol interfaces, provided that the foregoing conditions of minimum temperature are met.

The vinylchlorosilane employed may be any of those available in the art as, for example, vinyltrichlorosilane, divinyldichlorosilane, trivinylchlorosilane, etc. The silicon tetrahalide is preferably silicon tetrachloride because of its availability and inexpensiveness, although other silicon tetrahalides may be used. The proportion of vinylchlorosilane and silicon tetrahalide employed in preparing the cosol which will ultimately yield the vinyl-modified silica aerogel may be varied in wide proportions, depending on the number of vinyl groups it is desired to have present in the silica aerogel. In general, for optimum properties and versatility, it is desirable that the vinylchlorosilane comprise at least 5 to 50 percent of the total weight of the mixture of the vinylchlorosilane and the silicon tetrahalide. The exact proportion will depend upon such factors as the application for which the silica aerogel is intended, the number of vinyl groups desired in the vinylchlorosilane, etc.

The amount of water used for hydrolysis of the mixture of the vinylchlorosilane and the silicon tetrahalide may also be varied widely, and requires at least an amount of water necessary to effect complete hydrolysis of all the silicon-bonded halogen, for instance, silicon-bonded chlorines in the vinylchlorosilane and in the silicon tetrahalide. Usually, I may employ, on a weight basis, from about 1 to 5 parts of water per part of the mixture of vinylchlorosilane and silicon tetrachloride. The use of a cooling medium in the water of hydrolysis, for instance, ice, etc., is helpful in order to maintain the temperature reaction low enough to prevent undesirable polymerization of both the siloxane linkages and of the vinyl groups.

In order that those skilled in the art may better understand how the present invention may be practiced, the following examples are given by way of illustration and not by way of limitation. All parts are by weight.

*Example 1*

A mixture of 25 parts vinyltrichlorosilane and 75 parts silicon tetrachloride was hydrolyzed by pouring the mixture into a slurry of ice and water, in which the water comprised about 300 parts, by weight. The resulting gel which was obtained was separated by filtration, washed with water, and then was dissolved in a solution of 120 parts of sodium hydroxide and 300 parts water. One-quarter of this alkaline solution of silica and vinyl-modified silica was poured with stirring into 38 parts of sulfuric acid until the pH of the mixture was about 2 to 3. Ice was added from time to time to keep the temperature of the reaction mixture below room temperature. The resulting neutralized silicic acid solution then was added to 1000 parts of 95% ethanol and the precipitated sodium sulfate was removed by filtration. The alcohol sol was then passed through a 3-inch deep bed of Amberlite MB-3 ion exchange resin (described in bulletin entitled "Amberlite Monobed Deionization," published by Rohm and Haas Co., The Resinous Products Div., Washington Square, Philadelphia 5, Pa., as revised October 1950) to remove residual alkali metal ions and acid anions. This sol was then placed in a glass-lined pressure vessel or autoclave of 3000-liter capacity, and heated to 300° C. During the heating period, the pressure rose to above 2000 p.s.i., at which point vapor was slowly released at the top of the autoclave at such a rate as to maintain this temperature of 300° C. The slow release of vapor at these temperatures and pressures required about ½ to 1 hour. The pressure eventually was lowered by removal of vapor until the gas pressure or vapor pressure reached atmospheric pressure. The autoclave was sealed, and allowed to cool to room temperature and then opened, to yield a mass of snowy-white aerogel, resembling the usual silica aerogels of commerce. On heating to red heat, the material darkened considerably, indicating the presence of organic material. When a slurry of the aerogel in carbon tetrachloride was treated with a dilute solution of bromine in carbon tetrachloride, the color of the bromine disappeared, indicating unsaturation in the aerogel. This discharge of color was not observed when a sample of the commercial silica aerogel (Santocel C, properties described in Table I of Ind. & Eng. Chem. 45, 1298 (1953)) was tested similarly.

It will, of course, be apparent to those skilled in the art that other methods for making the above-described vinyl-modified silica aerogel may be employed without departing from the scope of the invention. In addition, different proportions of the ingredients used may be employed within the scope of the invention. Obviously, instead of employing vinyltrichlorosilane, one may also use lesser amounts of divinyldichlorosilane, or trivinylchlorosilane in place of the vinyltrichlorosilane, with the silicon tetrachloride to give again vinyl-modified silica aerogels, provided that the siloxane functionality is kept sufficiently high to yield a gel on hydrolysis.

The materials here described are useful in a variety of applications where it is desired to bond chemically organic materials to silica aerogels. Such applications include the reinforcing of silicone rubbers in which the siloxane polymer contains some vinyl or allyl groups; in various rubbers, natural or synthetic (e.g., butyl, GR-S, Perbunan, etc.), which contain organic unsaturation; and plastics such as polystyrene or polyacrylates (e.g., polymethyl acrylate, polyethyl acrylate, etc.), in which the monomer may be polymerized with and in the presence of the vinyl-modified silica aerogel to provide cross-linked and reinforced structures. The vinyl-modified silica aerogels of my invention are particularly suitable for use as filling and modifying agents for silicone rubbers containing silicon-bonded alkenyl, for instance, vinyl groups. The vinyl-modified silica aerogel may be incorporated in either the alkenyl-containing silicone rubber alone or mixtures of the latter with other covulcanizable ingredients such as the hydrocarbon rubbers mentioned above. More specific examples of such vinyl-modified silicone rubbers may be found disclosed in Hurd et al. applications, Serial Nos. 450,229 and 450,230, filed August 16, 1954, and assigned to the same assignee as the present invention.

Thus, the vinyl-modified silica aerogels of the present invention can be mixed with a monomer such as styrene, methyl methacrylate, acrylonitrile, vinyl-modified organopolysiloxanes (in which the vinyl group again is attached to the silicon), etc. and thereafter copolymerized in the presence of the usual copolymerizing agent such as peroxides, both organic and inorganic, such as benzoyl peroxide, tertiary butyl perbenzoate, etc., or in the case of rubbers containing organic unsaturation, using the conventional sulfur or other type of vulcanization agent, to give true interpolymers or covulcanizates in which the vinyl-modified silica aerogel comprises an integral part of the molecule. For this purpose, one may employ both bulk polymerization or emulsion polymerization, both well known in the art, or conventional vulcanization techniques used in the rubber art.

The presence of silicon-bonded vinyl groups in the vinyl-modified silica aerogel permits the preparation of cured, solid, elastic organopolysiloxanes (also known as "silicone rubbers") in which the vinyl-modified silica aerogel acts not only as a filler imparting reinforcing characteristics, but also acts as a modifying agent for the silicone rubber. Thus, one can mix about 30 to 40 parts of the vinyl-modified silica aerogel described in Example 1 with 100 parts of a vinyl polysiloxane gum disclosed and claimed in the aforesaid Hurd et al. applications, incorporate about 1 to 2 parts benzoyl peroxide, and heat the mixture of ingredients, preferably in a mold, at a temperature of about 160 to 175° C. for about 15 to 30 minutes, to obtain a cured, filled silicone rubber which exhibits outstanding heat resistance at elevated temperatures, and good flexibility at temperatures as low as —50 to —100° C. Such materials can be used as gaskets, as insulation for electrical conductors, etc. Because of the intimate reaction between the vinyl groups of vinyl-modified silica aerogel and of the silicon-bonded vinyl groups of the silicone gum, it will be found that the properties of the vulcanized product are better, particularly in moisture resistance, than are the usual methyl silicone gums containing silica aerogel fillers free of vinyl groups.

What I claim as new and desire to secure by Letters Patent of the United States is:

1. The process for making a silica aerogel containing silicon-bonded vinyl groups uniformly interspersed throughout the entire solid structure of said aerogel which comprises (1) cohydrolyzing a mixture of a vinylchlorosilane and a silicon tetrahalide, wherein the vinylchlorosilane represents from 5 to 50 percent of the combined weight of vinylchlorosilanes and silicon tetrahalide, to obtain a gelled cohydrolyzate, (2) dissolving the cohydrolyzate in an aqueous solution of an alkali-metal hydroxide, (3) acidifying the alkaline solution of the cohydrolyzate to a pH of from about 2 to 3, (4) precipitating the salt formed from the acidification step with an alcohol solution in which the alcohol is selected from the class consisting of methanol and ethanol, (5) autoclaving the alcohol solution thus obtained at a temperature and pressure at least equal to the critical constants of the mixture, and (6) thereafter releasing the vapors formed in the pressure reactor while continuing to maintain a temperature between 275° to 375° C.

2. The process as in claim 1 in which the vinylchlorosolane is vinyltrichlorosilane, the silicon tetrahalide is silicon tetrachloride, and the alcohol is ethanol.

3. The silica aerogel prepared according to claim 1.

4. A heat-curable synthetic rubber composition comprising (1) a silicone rubber gum having the average structural formula $$(CH_2=CH)_a(R)_b SiO_{\frac{4-(a+b)}{2}}$$

where R represents a member selected from the class consisting of alkyl, cycloalkyl, aryl, alkaryl, aralkyl, and halogenaryl radicals and mixtures thereof, at least 50 mol percent of said members being methyl radicals, $a$ has a value from 0.0086 to 0.18, $b$ has a value from 1.80 to 2,0014, the sum of $a$ plus $b$ being equal to from 1.98 to 2.01, and (2) a silica aerogel made by the process of claim 1.

5. A vulcanizable mixture comprising (A) 100 parts by weight of an organic polysiloxane gum having the average structural formula $$(CH_2=CH)_a(R)_b SiO_{\frac{4-(a+b)}{2}}$$

where R represents a member selected from the class consisting of alkyl, cycloalkyl, aryl, alkaryl, aralkyl, and halogenaryl radicals and mixtures thereof, at least 50 mol percent of said members being methyl radicals, $a$ has a value from 0.0086 to 0.18, $b$ has a value from 1.80 to 2.0014, the sum of $a$ plus $b$ being equal to from 1.98 to 2.01, (B) from 30 to 40 parts by weight of a silica aerogel made by the process of claim 1, and (C) from 1 to 2 parts by weight benzoyl peroxide.

6. A product comprising the vulcanized mixture of claim 5.

7. A product comprising the vulcanized composition of claim 4.

References Cited in the file of this patent

UNITED STATES PATENTS

| 2,441,422 | Krieble et al. | May 11, 1948 |
| 2,445,794 | Marsden | July 27, 1948 |
| 2,610,167 | Te Grotenhuis | Sept. 9, 1952 |
| 2,751,369 | Te Grotenhuis | June 19, 1956 |

OTHER REFERENCES

Iler: "The Colloid Chemistry of Silica and Silicates," publ. by Cornell University Press of Ithaca, N.Y. (1955), pages 137, 152 and 159.